(12) United States Patent
Maguire

(10) Patent No.: US 9,777,576 B2
(45) Date of Patent: Oct. 3, 2017

(54) DRUM SEAL

(71) Applicant: ROLLS-ROYCE PLC, London (GB)

(72) Inventor: Alan Robert Maguire, Derby (GB)

(73) Assignee: ROLLS-ROYCE plc, London (GB)

(*) Notice: Subject to any disclaimer, the term of this patent is extended or adjusted under 35 U.S.C. 154(b) by 430 days.

(21) Appl. No.: 14/095,462

(22) Filed: Dec. 3, 2013

(65) Prior Publication Data

US 2014/0169953 A1  Jun. 19, 2014

(30) Foreign Application Priority Data

Dec. 13, 2012 (GB) .................................. 1222415.0

(51) Int. Cl.
*F01D 1/24* (2006.01)
*F01D 5/06* (2006.01)

(52) U.S. Cl.
CPC .............. *F01D 5/06* (2013.01); *F01D 5/066* (2013.01); *F05D 2260/60* (2013.01); *F05D 2260/609* (2013.01)

(58) Field of Classification Search
CPC . F01D 5/066; F01D 5/025; F01D 5/06; F01D 11/02; F01D 11/025; F05D 2260/60; F05D 2260/609
USPC ..................................................... 416/198 A
See application file for complete search history.

(56) References Cited

U.S. PATENT DOCUMENTS

| | | | |
|---|---|---|---|
| 2,988,324 A * | 6/1961 | Sutters | F01D 5/06 416/201 R |
| 3,647,313 A * | 3/1972 | Koff | F01D 5/084 184/6.11 |
| 3,706,509 A | 12/1972 | Britt | |
| 5,232,339 A * | 8/1993 | Plemmons | F01D 5/084 415/177 |
| 5,288,210 A | 2/1994 | Albrecht et al. | |
| 7,870,742 B2 * | 1/2011 | Lee | F01D 5/082 60/782 |
| 8,382,432 B2 * | 2/2013 | Grissino | F01D 11/001 415/115 |
| 2005/0232774 A1 | 10/2005 | Suciu et al. | |

(Continued)

FOREIGN PATENT DOCUMENTS

EP  1 672 172 A1  6/2006

OTHER PUBLICATIONS

European Search Report issued in European Patent Application No. EP 13 00 5649 on Mar. 3, 2014.

(Continued)

*Primary Examiner* — Craig Kim
*Assistant Examiner* — Jason Mikus
(74) *Attorney, Agent, or Firm* — Oliff PLC

(57) ABSTRACT

A gas turbine engine comprising at least one drum pack having two or more annular discs 62a-c. Adjacent discs 62a-c are connected by drive arms 68 the drum pack is provided with a tubular sealing body 84 positioned radially inwards of the drive arms 68 and extending from a first disc 62a to a last disc 62c in the drum pack. The first 62a and last 62c discs have the greatest axial separation of all discs 62a-c in the drum pack. The sealing body 84 engaging the first 62a and last 62c discs and the engagement being arranged to limit or prevent the ingress of liquid into a drum cavity 76 defined between the first 62a and last 62c discs, the drive arms 68 and the sealing body 84.

14 Claims, 4 Drawing Sheets

(56) References Cited

U.S. PATENT DOCUMENTS

2006/0130456 A1* 6/2006 Suciu ................... F01D 5/066
  60/226.1
2008/0112794 A1 5/2008 Lee et al.
2009/0016886 A1 1/2009 Pichel
2011/0280735 A1* 11/2011 Dakowski ............... F01D 5/082
  416/97 R

OTHER PUBLICATIONS

Search Report issued in British Patent Application No. GB1222415.0 dated May 3, 2013.

* cited by examiner

DRUM SEAL

The present invention relates to gas turbine engines and a drum pack and sealing body for use in gas turbine engines. More specifically the invention is concerned with addressing life limiting hoop stress issues arising in gas turbine rotating discs as a result of liquid drainage holes required to drain liquids such as oil and water.

Gas turbine engines typically comprise several annular discs, each supporting a rotating blade stage (e.g. compressor or turbine blades). Collectively a group of joined discs form an annular drum with an internal drum cavity. The drum cavity incorporates a series of drive arms that attach each disc to its adjacent discs and ultimately to a shaft passing axially through the drum and used to rotate it.

Build up of oil and/or other liquid in the drum cavity may be a serious problem as it may result in an imbalance in the rotating drum leading to vibration and in extreme cases even drum burst. Oil may reach the drum cavity as the result of a seal failure in a local or upstream bearing chamber. The current solution to this problem is to drill radial liquid drainage passages through the disc drive arms. This allows oil and the like to drain out of the drum into the core annulus of the engine under the influence of centrifugal forces.

Similar passages are also used to allow gas to flow from the drum cavity, though the drive arms and into inter-stage cavities radially beyond the drive arms where it is used to cool the disc rims and/or blade root fixings.

The existing passages used for both liquid drainage and cooling gas flow are however in some respects disadvantageous as they result in concentrations of hoop stress contours around the periphery of the passages (typical stress concentration factor 2.6 to 3). This is a particular problem in high speed drum packs because hoop stress magnitude follows the following relationship: hoop stress=Material Density$\times$speed$^2\times$radius$^2$.

The increased hoop stress results in the need for decreased service intervals/life and/or an increase in the amount of material in the cob. The cob is an enlarged portion at the centre of the disc which provides radial support to the spinning blades attached to the disc. Increasing the size of the cob has a limited effect in supporting the drive arms and also increases the drum weight. Further increasing cob size ultimately becomes self-defeating and so there is a limit to which the additional hoop stresses can be compensated for in this way.

According to a first aspect of the invention there is a gas turbine engine optionally comprising at least one drum pack optionally having two or more annular discs, where adjacent discs are optionally connected by drive arms, and where further the drum pack is optionally provided with a tubular sealing body optionally positioned radially inwards of the drive arms and optionally extending from a first disc to a last disc in the drum pack, the first and last discs optionally having the greatest axial separation of all discs in the drum pack, the sealing body optionally engaging the first and last discs and the engagement optionally being arranged to limit or prevent the ingress of liquid into a drum cavity optionally defined between the first and last discs, the drive arms and the sealing body.

As will be appreciated the drum pack may surround one or more shafts of the gas turbine engine. The effect of sealing the drum cavity against the ingress of liquid may prevent oil, water and/or other liquids present in the annular region between the drum pack and the shafts from entering the drum cavity. Liquid may be present in this area as the result of leakage from a bearing chamber and/or as a consequence of water ingestion by the engine. As will be appreciated the bearing chambers and/or other sources of liquid may be remote from the drum cavity, (e.g. the bearing chamber and/or bearings may be outside of the drum cavity, beyond and separated from the sealing body).

A further advantage may be that the sealing body assists in the substantial separation and channelling of two airflows used for cooling and sealing purposes. It may be that these airflows are provided from different areas of the engine compressor system in order that they should be at different pressures.

Where these airflows pass respectively radially inwards and outwards of the drum pack, the sealing body may assist in separation of the two flows.

In some embodiments the drive arms are not provided with liquid drainage passages. Radially extending through-bores in the drive arms are commonly used in prior art systems to allow drainage of liquid that has entered the drum cavity. The present invention may remove the need for such through-bores, which would otherwise cause hoop stress concentrations. In this way the need for additional material in the annular discs to reduce the impact of hoop stress may be avoided, reducing the weight of the drum pack. The elimination of the hoop stress concentrations caused by the drainage passages may also reduce engine lifecycle costs, increase disc and drum life and allow operation at higher nominal hoop stress levels than would otherwise be the case.

In some embodiments the sealing body is a single piece. A single piece embodiment may be preferable as a multi-piece sealing body may be prone to liquid ingress between the pieces.

In some embodiments, at points adjacent each disc, the sealing body extends radially inwards of the minimum radial extent of the respective disc. By keeping the sealing body inwards of the drum it is possible to avoid the creation of a potential liquid pooling area that might otherwise be formed in a region bounded by one or more discs and the sealing body.

In some embodiments the engagement is arranged to direct the flow of liquid away from an interface region between the sealing body and the respective first or last disc when the engine is in use.

In some embodiments the sealing body comprises a radially outwardly extending rim at one or both of its ends adjacent the respective first or last disc. The rim may provide a convenient anchor point for securing the sealing body relative to the respective disc.

In some embodiments the rim extends on the side of the adjacent disc opposite the drum cavity. Positioning the rim(s) in this way such that the sealing body partially surrounds the drum may improve the sealing effect of the sealing body. Further the rim may serve to direct a prevailing flow of liquid away from the interface region between the sealing body and the respective first or last disc.

In some embodiments the interface region of the first and/or last disc with the sealing body is provided with one or more passages arranged to permit the flow of gas there through. The interface may for example be a castellated support with passages for gas flow intermediate the castellations. The flow of cooling gas past the sealing body and into the drum cavity may be desirable in order to cool rims of the discs.

In some embodiments the sealing body is provided with a sloping gradient in the axial direction. The slope may reduce or prevent the dwell time of liquid on the sealing body. When the engine is in use and the sealing body is rotating with the drum pack, centrifugal forces will cause liquid on the sealing body to run radially outwards in accordance with the direction of the slope. This will encourage the liquid to move around the drum pack.

In some embodiments the gas turbine engine is further provided with one or more fluid passages external to the drum pack to allow fluid to pass radially outwards and around the drum pack into a core flow annulus. The sealing body (in particular the axial slope and rim(s) where present) may contribute to the formation of these passages. Once the fluid has reached the core flow annulus it may be passed out of the rear of the engine or may be burnt off.

In some embodiments the rim is arranged such that the only access from the fluid passage to the interface region is from the radially inward direction. In this way gas and/or liquid travelling radially outward around the drum pack as the result of centrifugal forces will not access the interface region. Thereafter liquid will tend to continue in the radially outward direction passing through the remainder of the fluid passage into the core flow annulus. In contrast gas may swirl around the fluid passage, in some cases travelling radially inwards and passing through the passages of the interface region. As will be appreciated this arrangement may give the engagement between the sealing body and the disc liquid resistant properties while continuing to allow the flow of cooling gas into the drum cavity.

In some embodiments radial gas flow passages are provided at the joint between drive arms extending from adjacent discs. As noted above a mechanism may be provided for gas to enter the drum cavity despite the fluid resistant engagement of the sealing body with the first and last disc. It may also be desirable to allow this gas to pass the drive arms so as it may cool the rim of the drum and/or blade root fixings. Currently this is typically permitted by gas flow passages provided in the drive arms, which have similar stress concentrating properties to the liquid drainage passages of the prior art. By providing gas flow passages at the joint between drive arms. these stress concentrations can be avoided. Since the sealing body has negated the need to provide liquid drainage passages in the drive arms the alternative method of providing the gas flow passages allows the potential of the invention to be further realised.

In some embodiments the radial gas flow passages are provided in a seal ring positioned at the joint between drive arms extending from adjacent discs. The joint may be a bolted joint, one or more bolts passing through radially extending flanges located at the adjacent ends of the drive arms and the seal ring positioned between the flanges.

In some embodiments the fluid passages external to the drum pack supply gas flow to one or more inter-disc stage cavities via one or more blade root gas passages in one or more blade root fixings. This may provide an alternative to ventilating the blade root fixings and/or disc rims using gas from the drum cavity. This embodiment is also consistent with avoiding the need for gas flow passages through the drive arms.

In some embodiments the drum pack is arranged to be operable at high rotation speed. The drum pack may for example be arranged to be operable at rotation speeds in excess of 5000 rpm, or in excess of 6000 rpm, or in excess of 8000 rpm, or in excess of 10000 rpm, or in excess of 15000 rpm. In higher speed drum packs the problem of hoop stress contours around liquid drain passages is more problematic, therefore the invention may have particular application to such drum packs.

According to a second aspect of the invention there is provided a gas turbine engine drum pack in accordance with the first aspect of the invention.

According to a third aspect of the invention there is provided a sealing body in accordance with the first aspect of the invention.

BRIEF DESCRIPTION OF DRAWINGS

Embodiments of the invention will now be described by way of example only, with reference to the accompanying figures, in which.

Figure 1:
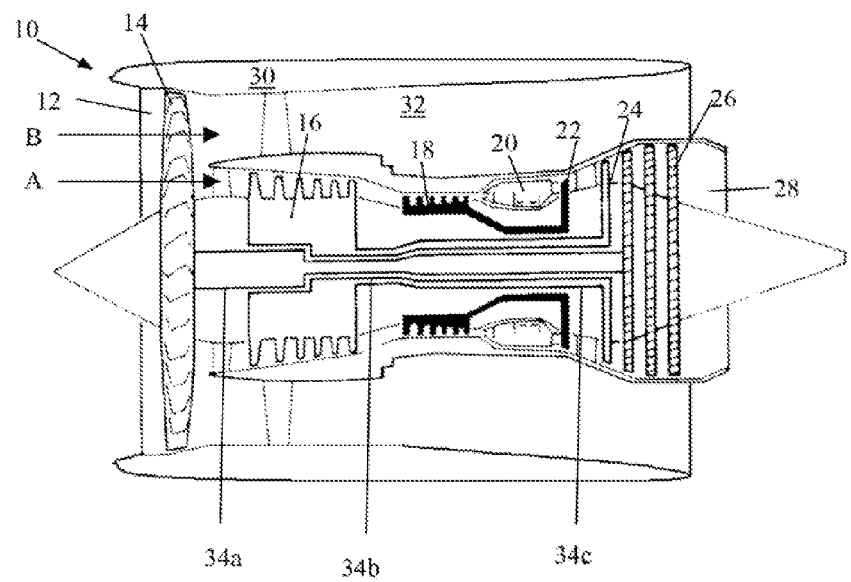
FIG. 1 is a sectional schematic side view of a gas turbine engine.

A gas turbine engine 10 is shown in FIG. 1 and comprises an air intake 12 and a propulsive fan 14 that generates two airflows A and B. The gas turbine engine 10 comprises, in axial flow A, an intermediate pressure compressor 16, a high pressure compressor 18, a combustor 20, a high pressure turbine 22, an intermediate pressure turbine 24, a low pressure turbine 26 and an exhaust nozzle 28. A nacelle 30 surrounds the gas turbine engine 10 and defines, in axial flow B, a bypass duct 32.

As will appreciated references throughout this document to axial and radial refer to the overall architecture of the engine. Therefore the axial direction corresponds to the direction of engine drive shafts (34a-c) and to the axial flow directions A and B, while the radial direction is perpendicular to this.

Figure 2:
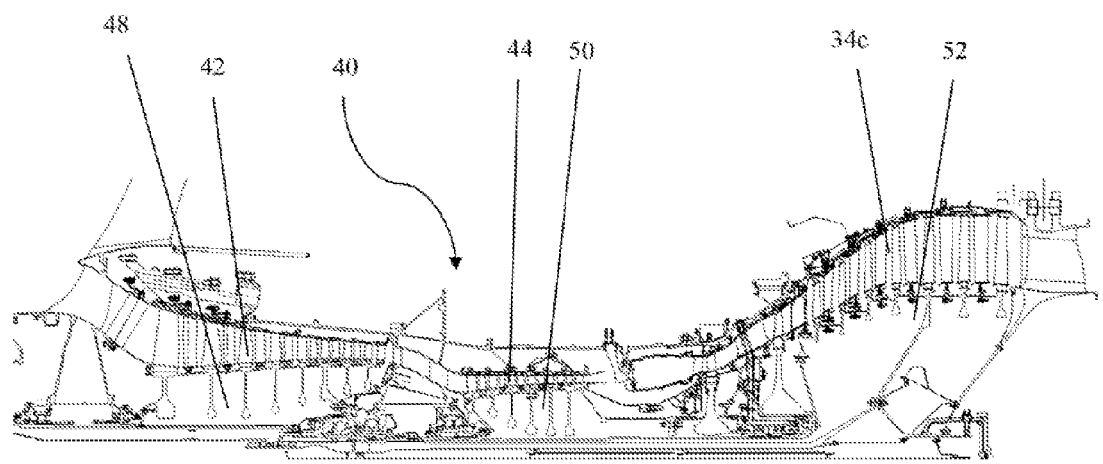
FIG. 2 is a sectional side view of a gas turbine engine.

Referring now to FIG. 2, parts of an engine 40 are discussed in greater detail. The engine 40 comprises an intermediate pressure compressor 42, a high pressure compressor 44 and a low pressure turbine 46. Each of the compressors 42, 44 and turbine 46 comprise a number of discs which together form a drum pack (intermediate pressure compressor drum 48, high pressure compressor drum 50 and low pressure turbine drum 52).

Figure 3:
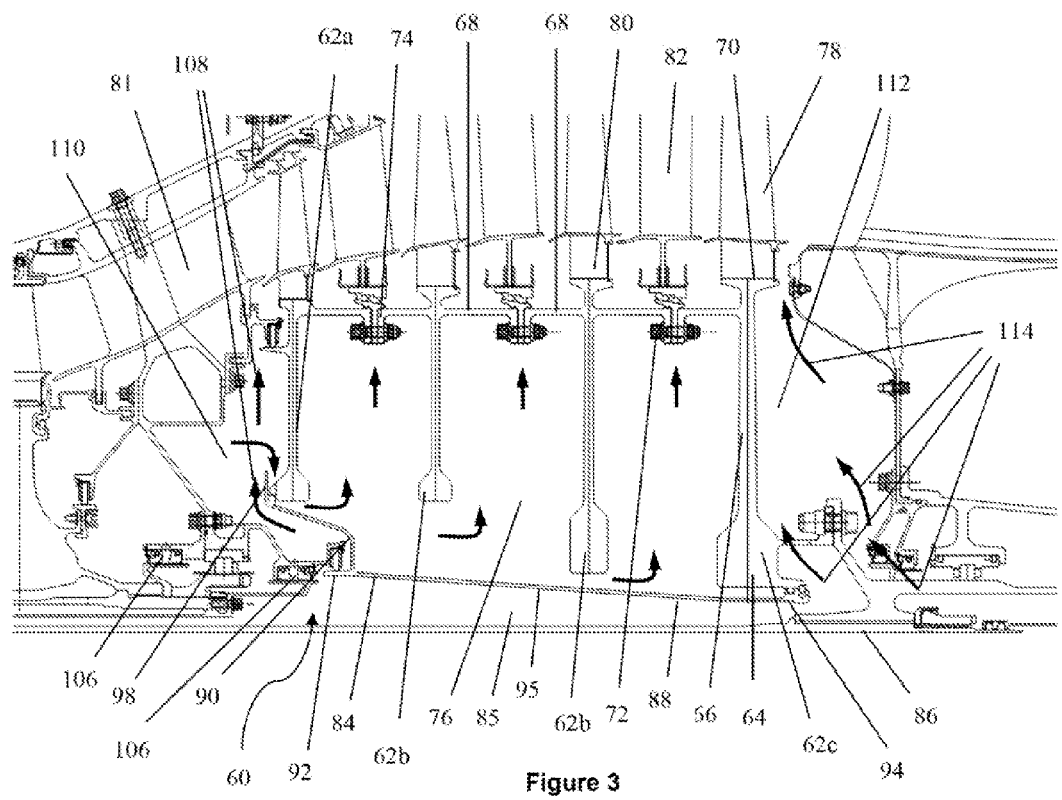
FIG. 3 is a sectional side view of a turbine with a sealing body in accordance with the present invention.

Referring now to FIG. 3 a turbine drum 60 is shown in greater detail. The turbine drum 60 has four annular discs, a first disc 62a, two intermediate discs 62b and a last disc 62c. Each disc 62a-c comprises a cob 64, a diaphragm 66 a pair of drive arms 68 and a rim 70. The drive arms 68 extend from the diaphragm 66 of the respective disc 62a-c, perpendicularly to it and one on either side. The drive arms 68 of adjacent discs 62a-c that extend towards each other are joined by bolts (only one 72 shown in each case) through radially extending flanges 74 at the ends of the drive arms 68. The volume surrounded by the drive arms 68 and first 62a and last 62c disc is a drum cavity 76. The drive arms 68 are not provided with liquid drainage passages.

Radially outward of each disc rim 70 is a turbine blade 78. Each blade 78 is attached to its respective rim 70 at a blade root 80. The turbine blades 78 extend radially outwards through a core annulus 81. Between the turbine blades 78 nozzle guide vanes 82.

The drum cavity 76 is substantially sealed by a tubular sealing body 84. The tubular sealing body 84 extends in the axial direction from the first 62a to the last 62c disc. The sealing body 84 is a single piece (i.e. it does not comprise several pieces each spanning a part of the distance between the first 62a and last 62c discs). Sealing body 84 is also continuous in the sense that it does not have holes or gaps. The sealing body 84 therefore seals the drum cavity 76 and surrounds an annular region 85 between the drum cavity 76 and engine shafts 86.

In the embodiment of FIG. 3 the sealing body 84 comprises two portions; a main body 88 and a linking body 90.

Figure 5:
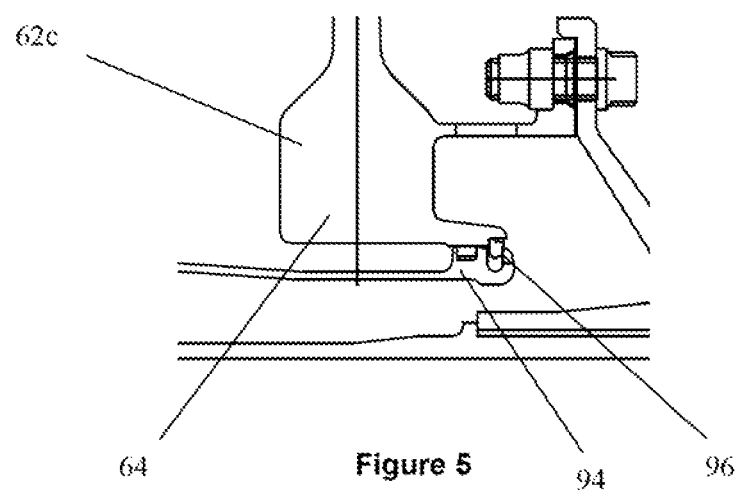
FIG. 5 is a sectional side view of a portion of a sealing body in accordance with the present invention.

The main body 88 is tubular in formation and has an upstream 92 and a downstream 94 end. The diameter of the main body 88 increases uniformly from the downstream end 94 to the upstream end 92. This increase in diameter gives the main body 88 a slope 95 running down towards the upstream end 92. The angle of the slope 95 may be selected in order to achieve the desired liquid run-off rate (thus reducing liquid dwell time and potential ignition). In some embodiments the degree of the slope 95 is less than 40° and may be less than 20°, 10°, 5° or 1°. As will be appreciated the slope 95 might also be in the other direction (e.g. a negative slope), that is the diameter of the main body 88 might increase from the upstream end 92 to the downstream end 94. As best shown in FIG. 5, the downstream end 94 of the main body 88 is attached to the cob 64 of the last disc 62c via a circlip fixing 96. The circlip fixing 96 forms a liquid (and in this case fluid) sealing engagement between the last disc 62c and the sealing body 84. An exemplary alternative sealing arrangement would be a flange bolted joint (not shown).

Figure 4:
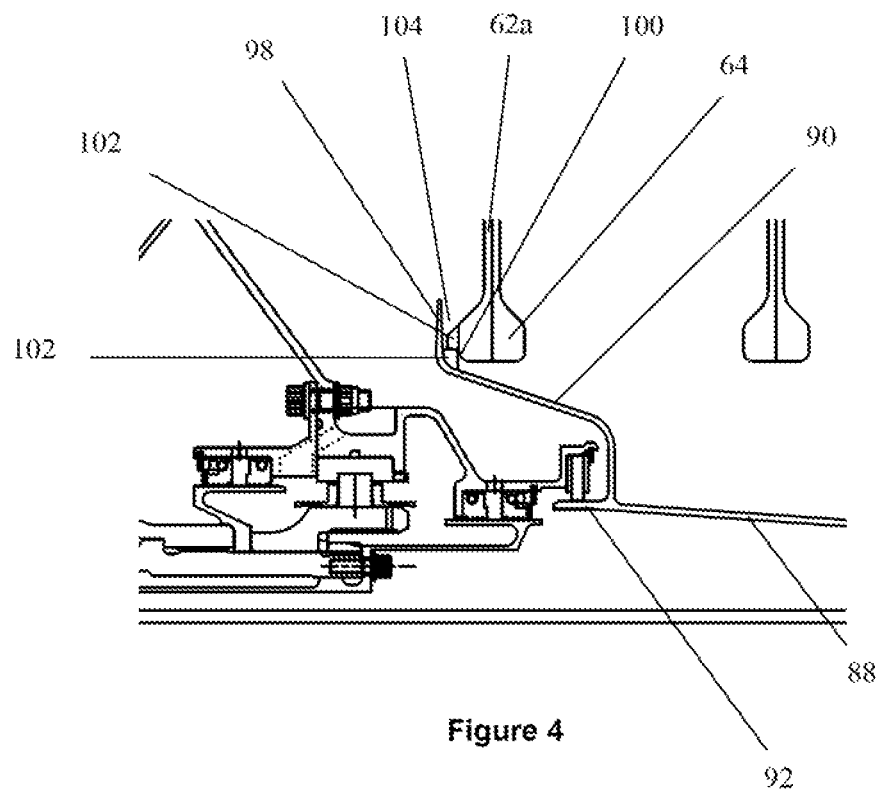
FIG. 4 is a sectional side view of a portion of a sealing body in accordance with the present invention.

The linking body 90 is substantially conical in shape. The apex of the cone meets the main body 88 proximate its upstream end 92. As best shown in FIG. 4, the base of the cone terminates in a radially outwardly extending rim 98 which abuts an upstream face 100 of the cob 64 of the first disc 62a. As best shown in FIG. 4, the rim 98 and upstream face 100 are provided with cooperating castellations 102, which engage at an interface region to form passages (not shown) arranged to allow the flow of gas there through. As can be seen the rim 98 is separated from the first disc 62a in an area radially outwards of the interface region, thus creating a gas flow channel 104 leading to the castellations 102.

Returning to FIG. 3 a number of bearing chambers 106 are shown. Bearings of the bearing chambers 106 avow for rotating and static parts of the engine to support one another. The bearing chambers 106 are lubricated with oil, which is retained within the chamber by seals (not shown). Additional bearing chambers (not shown) are also provided in the upstream and downstream directions.

In use the sealing body 84 has a primary function of substantially preventing the flow of liquid into the drum cavity 76. As will be appreciated seals used in the bearing chambers 106 may fail, resulting in the release oil. Such oil and/or other liquids present in the engine (e.g. as the result of rainwater ingestion) may reach the annular region 85 and/or other regions in this vicinity. Without the presence of the sealing body 84, this liquid would (under the influence of centrifugal forces) tend to collect in the drum cavity 76 as the drum pack spins. Here however liquid impinging on the sealing body 84 cannot enter the drum cavity 76 and tends to move around it and radially outwards under the influence of centrifugal forces. As shown by arrows 108 the liquid may travel down the slope 95 and through a fluid passage 110 external to and around the drum pack until it reaches the core annulus 81. As can be seen the linking body 90 (including the rim 98) forms part of this fluid passage 110. Additionally and/or alternatively liquid may flow to the core annulus 81 around the downstream side of the drum pack in a fluid passage 112 as shown for example by arrows 114.

Liquid in fluid passage 110 will tend to continue radially outwards until it reaches the core annulus 81. The linking body 90 (including the rim 98) therefore helps to direct liquid away from the interface region and prevent the ingress of liquid into the drum cavity 76. In contrast gas in the fluid passage 110 will tend to swirl around. It can therefore travel radially inwards down the gas flow channel 104 and into the drum cavity 76 via the passages created by the castellations 102. In this way the sealing body 84 may substantially prevent the ingress of liquid into the drum cavity 76, without preventing the flow of cooling/sealing gas into the drum cavity 76. The need for drainage passages through the drive arms 68 (with the attendant hoop stress problems caused) may therefore be eliminated. Further the gas entering the drum cavity may be used to cool the drive arms and ventilate the rims 70 and blade root fixings 80 (as described further below).

The sealing body 84 also has a secondary function of maintaining separation between cooling/sealing airflows travelling axially through the engine. Different cooling/sealing airflows may be taken from different compressor stages in order that they should be at different pressures. In this way the minimum air may be taken from the compressor as is required for a particular cooling/sealing operation. In view of the above it may be desirable to keep such airflows substantially separate in order that their pressures do not equalise. The main body 88 assists in creating the annular region 85 between the drum cavity 76 and engine shafts 86. This may provide a passage for a sealing/cooling airflow that is substantially isolated from other potential sealing/cooling airflows (e.g. for cooling the nozzle guide vanes 82).

Figure 6:
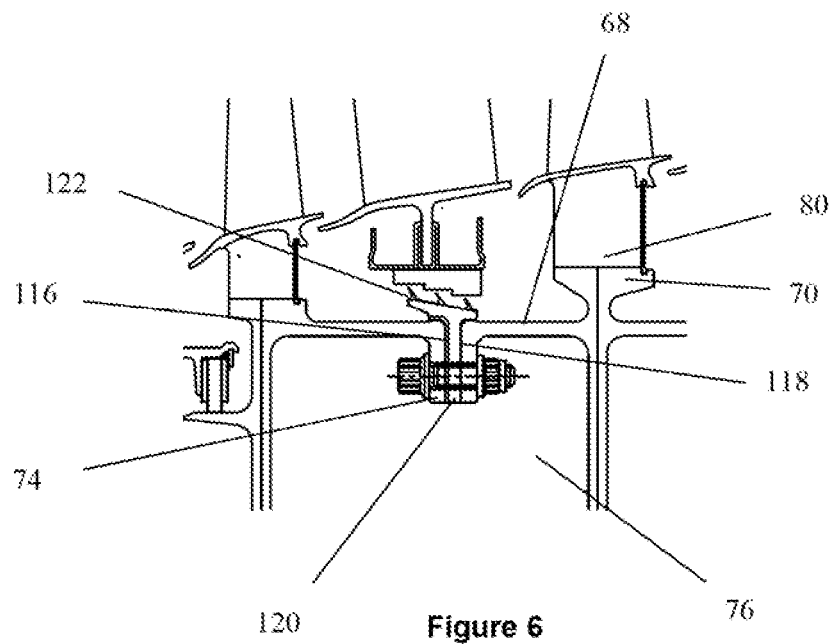
FIG. 6 is a sectional side view of disc drive arms accordance with the present invention.

As mentioned previously gas entering the drum cavity 76 via the passages provided by the castellations 102 may be used to cool the rims 70 and/or blade root fixings 80. With reference to FIG. 6 this is achieved via radial gas flow passages 116 provided at joints 118 between drive arms 68. The gas flow passages 116 are formed within a seal ring 120 disposed between the drive arms 68. Additionally the seal ring 120 may provide turbine inter-stage sealing fins 122 as shown here. The gas flow passages 116 may mean that it is not necessary to provide passages directly through the drive arms 68 in order that the cooling gas can pass. It will be appreciated that if the radial gas flow passages 116 were provided without the sealing body 84 being present, liquid may pool and dwell in the drum cavity 76 either side of the radially extending flanges 74. Therefore the gas flow passages 116 and sealing body 84 are complementary technologies each allowing the other to offer greater benefit.

Figure 7:
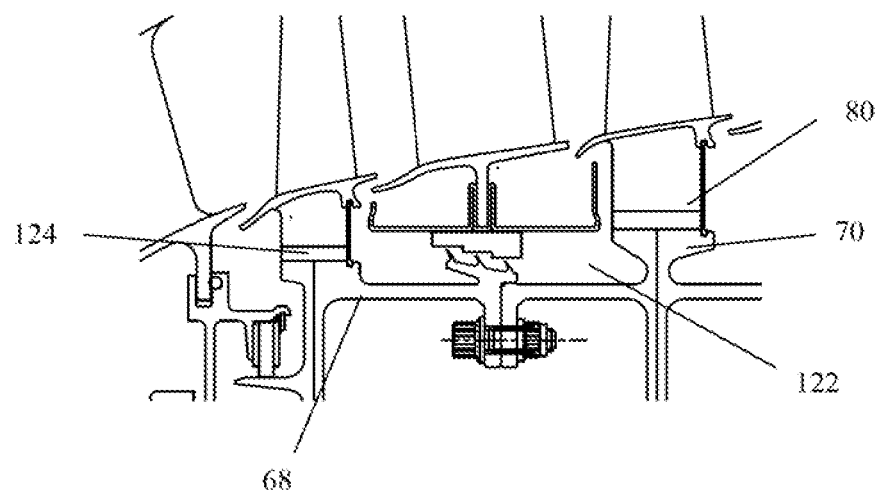
FIG. 7 is a sectional side view of disc drive arms in accordance with the present invention.

Alternatively and with reference to FIG. 7 the rims 70 and/or the blade root fixings 80 may be ventilated by at least a portion of a gas flow travelling through the fluid passage 110. The gas flow portion may enter successive inter-stage cavities 122 via axially extending blade root gas passages 124 in the blade root fixings 80. As with the embodiment of FIG. 6, this negates the need for passages through the drive arms 68 and works in cooperation with the sealing body 84.

The invention claimed is:
1. A gas turbine engine comprising:
   at least one drum pack surrounding a shaft and having two or more annular discs, each of the annular discs comprising a cob, a diaphragm, one or more drive arms, and a rim, wherein
   adjacent discs of the two or more annular discs are connected by the drive arms, the at least one drum pack is provided with a tubular sealing body positioned radially inwards of the drive arms, the tubular sealing body extending from a first disc of the two or more annular discs to a last disc of the two or more annular discs in the drum pack, the first disc and the last disc having the greatest axial separation of all of the annular discs in the drum pack, the sealing body engaging the first disc and the last disc, and the engagement being arranged to limit or prevent ingress of liquid into a drum cavity defined between the first disc and the last disc, the drive arms, and the sealing body, the sealing body has an upstream end and a downstream end and comprises a radially outward extending rim at the upstream end adjacent the first disc, the sealing body and the radially outward extending rim are a single piece, and the radially outward extending rim abuts an upstream face of the cob of the first disc.

2. The gas turbine engine according to claim 1, wherein the drive arms are not provided with liquid drainage passages.

3. The gas turbine engine according to claim 1, wherein at points adjacent each of the two or more annular discs, the sealing body extends radially inwards of a minimum radial extent of the respective disc of the two or more annular discs.

4. The gas turbine engine according to claim 1, wherein the engagement is arranged to direct a flow of liquid away from an interface region between the sealing body and the respective first disc or last disc when the engine is in use.

5. The gas turbine engine according to claim 1, wherein the rim extends on a side of the adjacent disc opposite the drum cavity.

6. The gas turbine engine according to claim 1, further comprising one or more fluid passages external to the drum pack configured to allow fluid to pass radially outwards and around the drum pack into a core annulus, wherein the rim is arranged such that the only access from the one or more fluid passages to the interface region is from a radially inward direction.

7. The gas turbine engine according to claim 4, wherein the interface region of the first disc and/or the last disc with the sealing body is provided with one or more passages arranged to permit a flow of gas there through.

8. The gas turbine engine according to claim 1, wherein the sealing body is provided with a sloping gradient in the axial direction.

9. The gas turbine engine according to claim 1, further comprising one or more fluid passages external to the drum pack to allow fluid to pass radially outwards and around the drum pack into a core flow annulus.

10. The gas turbine engine according to claim 1, wherein radial gas flow passages are provided at a joint between the drive arms extending from the adjacent discs.

11. The gas turbine engine according to claim 10, wherein the radial gas flow passages are provided in a seal ring positioned at the joint between the drive arms extending from the adjacent discs.

12. The gas turbine engine according to claim 9, wherein the one or more fluid passages external to the drum pack supply gas flow to one or more inter-disc stage cavities via one or more blade root gas passages in one or more blade root fixings.

13. A gas turbine engine drum pack for surrounding a shaft in a gas turbine engine, the drum pack comprising:

two or more annular discs, each of the annular discs comprising a cob, a diaphragm, one or more drive arms, and a rim, wherein adjacent discs of the two or more annular discs are connected by the drive arms; and a tubular sealing body positioned radially inwards of the drive arms, the tubular sealing body extending from a first disc of the two or more annular discs to a last disc of the two or more annular discs in the drum pack, the first disc and the last disc having the greatest axial separation of all of the annular discs in the drum pack, the sealing body engaging the first disc and the last disc, and the engagement being arranged to limit or prevent ingress of liquid into a drum cavity defined between the first disc and the last disc, the drive arms, and the sealing body, wherein the sealing body has an upstream end and a downstream end and comprises a radially outward extending rim at the upstream end adjacent the first disc, the sealing body and the radially outward extending rim are a single piece, and the radially outward extending rim abuts an upstream face of the cob of the first disc.

14. A sealing body for use in a gas turbine engine drum pack that surrounds a shaft in a gas turbine engine, the drum pack having two or more annular discs, each of the annular discs comprising a cob, a diaphragm, one or more drive arms, and a rim, wherein adjacent discs of the two or more annular discs are connected by the drive arms, the sealing body comprising:

a tubular sealing body configured to be positioned radially inwards of the drive arms of the two or more annular discs, the tubular sealing body being configured to extend from a first disc of the two or more annular discs to a last disc of the two or more annular discs in the drum pack, the first disc and the last disc having the greatest axial separation of all of the annular discs in the drum pack, the tubular sealing body engaging the first disc and the last disc, and the engagement being arranged to limit or prevent ingress of liquid into a drum cavity defined between the first disc and the last disc, the drive arms, and the tubular sealing body, wherein the sealing body has an upstream end and a downstream end and comprises a radially outward extending rim at the upstream end adjacent the first disc, the sealing body and the radially outward extending rim are a single piece, and the radially outward extending rim abuts an upstream face of the cob of the first disc.

* * * * *